United States Patent
Wang et al.

(10) Patent No.: US 11,469,839 B2
(45) Date of Patent: Oct. 11, 2022

(54) METHODS, SYSTEMS AND DEVICES OF APPROXIMATELY SYNCHRONOUS BROADCAST OF AIRCRAFTS

(71) Applicant: University of Electronic Science and Technology of China, Chengdu (CN)

(72) Inventors: Yulin Wang, Chengdu (CN); Yu Luo, Chengdu (CN); Siyu Zhan, Chengdu (CN); Ruiqin Wu, Chengdu (CN)

( * ) Notice: Subject to any disclaimer, the term of this patent is extended or adjusted under 35 U.S.C. 154(b) by 81 days.

(21) Appl. No.: 16/937,576

(22) Filed: Jul. 23, 2020

(65) Prior Publication Data
US 2021/0399819 A1 Dec. 23, 2021

(51) Int. Cl.
*H04H 20/55* (2008.01)
*H04H 20/08* (2008.01)
*H04H 20/14* (2008.01)
*H04H 20/42* (2008.01)
*H04H 20/62* (2008.01)

(52) U.S. Cl.
CPC ............ *H04H 20/55* (2013.01); *H04H 20/08* (2013.01); *H04H 20/14* (2013.01); *H04H 20/423* (2013.01); *H04H 20/62* (2013.01)

(58) Field of Classification Search
CPC ........ H04H 20/55; H04H 20/08; H04H 20/14; H04H 20/423; H04H 20/62; H04B 7/18506; H04W 4/06; H04W 56/001

USPC ....................................................... 455/186.1
See application file for complete search history.

(56) References Cited

U.S. PATENT DOCUMENTS

| 2015/0331099 A1* | 11/2015 | Wu ....................... G01S 13/876 342/32 |
| 2022/0015102 A1* | 1/2022 | Gallagher .......... H04B 7/18541 |

* cited by examiner

*Primary Examiner* — Shaima Q Aminzay
(74) *Attorney, Agent, or Firm* — W&K IP (57) ABSTRACT

This invention is related to automatic monitoring and collaboration among aircrafts. Specifically, an aircraft receives the current and future state of adjacent aircrafts by broadcast, then analyzes the start time of collaborative tasks. Base on the start time and prior knowledge, it adjusts automatically the prediction accuracy requirements of its future states, the check interval of predicted state errors and the minimum check interval. And it makes a new prediction and broadcasts new future states based on the check results of prediction errors. In the invention, an aircraft does not periodically broadcast its states, but broadcasts irregularly its future states according to its current tasks, its states and surrounding environment. The invention guarantees that collaborative tasks can be can be correctly carried out among aircrafts while it reduces the bandwidth requirement of wireless communication. It provides guarantee of high density flight and collaboration among many aircrafts.

5 Claims, 6 Drawing Sheets

METHODS, SYSTEMS AND DEVICES OF APPROXIMATELY SYNCHRONOUS BROADCAST OF AIRCRAFTS

CROSS-REFERENCE TO RELATED APPLICATIONS

This application claims priority to Chinese Patent Application No. 202010552052.5 with a filing date of Jun. 17, 2020. The content of the aforementioned application, including any intervening amendments thereto, are incorporated herein by reference.

BACKGROUND

1. Technical Field

The present disclosure generally relates to the automatic monitoring and collaboration technology of many aircrafts and, more particularly, to approximately synchronous broadcast methods, systems and devices.

2. Description of the Related Art

Many aircrafts implement task synchronization by information sharing, thus finishes collaboratively many real-world tasks, such as automatic monitoring and collaborative collision avoidance. Because of the high motility of aircrafts, the real-time change of tasks or states and the failure of aircrafts, the wireless communication network composed by many aircrafts is unstable and has limited band-width, and the network topology changes dynamically. Broadcast communication is an efficient way to implement the collaboration between adjacent aircrafts. When an aircraft is carrying out a task, its states, such as space position, attitude and velocity, are changing in real time. Each aircraft shares its own current states in real time with adjacent aircrafts, space stations and ground stations, thus implements to perceive the dynamic environment of surrounding space, and further implements task collaboration.

Existing broadcast methods of aircrafts always broadcasts their own state at regular interval to adjacent aircrafts, space stations and ground stations. These network nodes receive the broadcast messages and cope with these messages, such as reconstructing the flight trajectory of adjacent aircrafts and predicting the future flight trajectory of adjacent aircrafts. Since the collaborative tasks have different requirements for aircraft's flight states or information accuracy of task states in different conditions or at different times. The broadcast methods with regular interval will cause aircrafts to be unable to perceive the dynamic change in surrounding environments in real time in the case of larger quantities of aircrafts, and will further affect collaborative decision making on collaborative tasks. When the broadcast frequency is too low, the perception of dynamic environment has lower accuracy and lower real-time. When the broadcast frequency is too high, the bandwidth resources of wireless communication links are wasted, or the delay of transmitting the timely messages is too long because of too many conflicts of wireless links.

SUMMARY OF THE DESCRIPTION

The disclosure proposes an approximately synchronous broadcast method and the corresponding system and device for dealing with the problems in existing technology. In the proposed invention, an aircraft perceives firstly the current and future states of surrounding environment based on the received messages broadcasted from the other aircrafts. Then it adjusts automatically its broadcast parameters of its states and the accuracy thresholds of state prediction required by current tasks. When the prediction error of one state is greater than the required threshold of prediction accuracy or the prediction time is over, the aircraft makes a new prediction and broadcasts again, and the broadcast content contains the current value and the future predicted values of each state. That is, when the state prediction error satisfies the requirement of current collaborative tasks, an aircraft does not broadcast its own states, and guarantees not to affect the collaboration between it and other aircrafts. In the proposed method, the interval between two successive broadcasts is not fixed, and it can be adaptively adjusted according to the change in surrounding environment, the current task requirement and its state's change.

The method implements the perception of surrounding environment change in advance, and the adaptive broadcast based on tasks and environment change. The basic idea behind the method is to decide whether to broadcast based on the fact that the prediction error of future states satisfies the requirement of collaborative tasks. The method helps efficiently the collaboration and cooperation among multiple aircrafts, space stations and ground stations, and helps to reduce the number of broadcasts and the bandwidth consumption of wireless communication for aircrafts.

BRIEF DESCRIPTION OF THE DRAWINGS

The drawings help to provide further understanding of the technical scheme of the invention, and form a part hereof. They explain the invention with the embodiments of the invention, but do not confine the technical scheme of the invention.

DESCRIPTION OF THE PREFERRED EMBODIMENTS

To explain the purpose, the technical scheme and advantages of the invention more clearly, the typical embodiment of the invention is descripted in detail with the attached drawings. Obviously, the descripted embodiment is an embodiment of the invention in some cases, rather than in all the cases. It is noteworthy that the embodiments of the invention or the features of the embodiment can be combined freely in the case of no conflicts.

The given steps of the flowcharts in the attached drawings can be executed in a computer system, which can run a group of computer executable instructions. Although the flowcharts have given the logical order, the given or described steps can be executed in some cases in a different order from here.

The application scope of the embodiment is the case of automatic state monitoring and task collaboration among many aircrafts, ground stations and space stations. The executor of the embodiment is the processing systems of automatic state monitoring and communication in an aircraft. The systems can be the information processing platform of an aircraft, an independent part, a part appended to a flight control processor or other existing computing processors. Since aircrafts need to broadcast in the nearby airspace, a processing system of automatic state monitoring and communication contains a wireless communication module in addition to the processor. The module includes but does not limit to WiFi, Bluetooth, and mobile communication and so on. Furthermore, because an aircraft needs to broadcast its future states, the processing system of automatic state monitoring also contains the sensing module of space position, including but not limited to outdoor or indoor positioning modules, such as GPS (Global Positioning System) and BDS (BeiDou Navigation Satellite System), three-dimensional ranging radars and so on, in addition to the state sensing module of flight and tasks.

During the flight process, an aircraft broadcasts its short future states in the nearby airspace according to the requirement of collaborative tasks, meanwhile it receives and processes the short future states of the other aircrafts in the nearby airspace. The three tasks, i.e., the prediction and broadcast of future states, the receiving and analysis of future states of other aircrafts and the parameter adjustment of approximately synchronous broadcast, are always executed concurrently without any particular order. The broadcast content contains the current value and future predicted values of each state, the check step size of each state and the minimum check interval. The receiving contents of an aircraft are correspondingly the broadcast contents of the other aircrafts.

Figure 1:
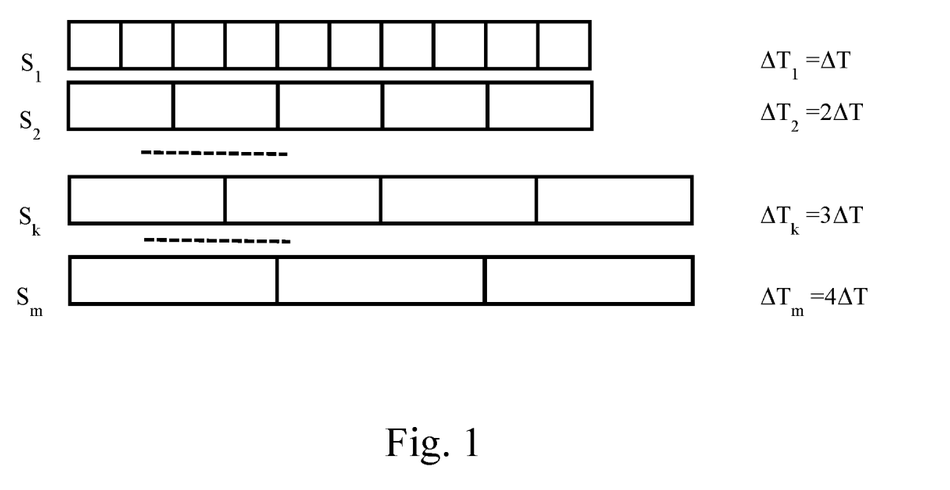
FIG. 1 is a diagram illustrating the list of broadcast queues according to the invention.

FIG. 1 is a diagram illustrating the list of broadcast queues according to the invention. In the list, each state corresponds to a broadcast queue, and the content of broadcast queues contains the currently observed value and the short future predicted values of the corresponding state. The list can store the current value and predicted values of many states with different check frequency of prediction errors. The whole list of broadcast queues has a minimum check interval $\Delta T$, and each broadcast queue corresponds to a check step size $\Delta T_i$ of prediction errors. The check step size $\Delta T_i$ of each state must be positive integer times the minimum check interval $\Delta T$. The check step size $\Delta T_i$ of different state can be different. For any state prediction for the next T time, however, let n denote the element total of queue $S_i$, then $T=(n-1)*\Delta T_i$. The next T time can be set by users or systems as required, and it can be from several seconds to tens of minutes. The list of broadcast queues is not fixed, and it can dynamically be adjusted with time or state change. Once a new state prediction is made, the list is updated. Every the minimum check interval $\Delta T$, the list is checked once and the first elements of some queues are deleted to guarantee that the corresponding time of the first elements of queues has not come and will come first. To implement to adjust dynamically the list of broadcast queues, each state has a corresponding required threshold of prediction accuracy, which is used for triggering the prediction and broadcast operations. In addition, the whole list has a serial number t of time steps, which is used for deleting the first elements of broadcast queues and for triggering the prediction and broadcast operations.

Figure 2:
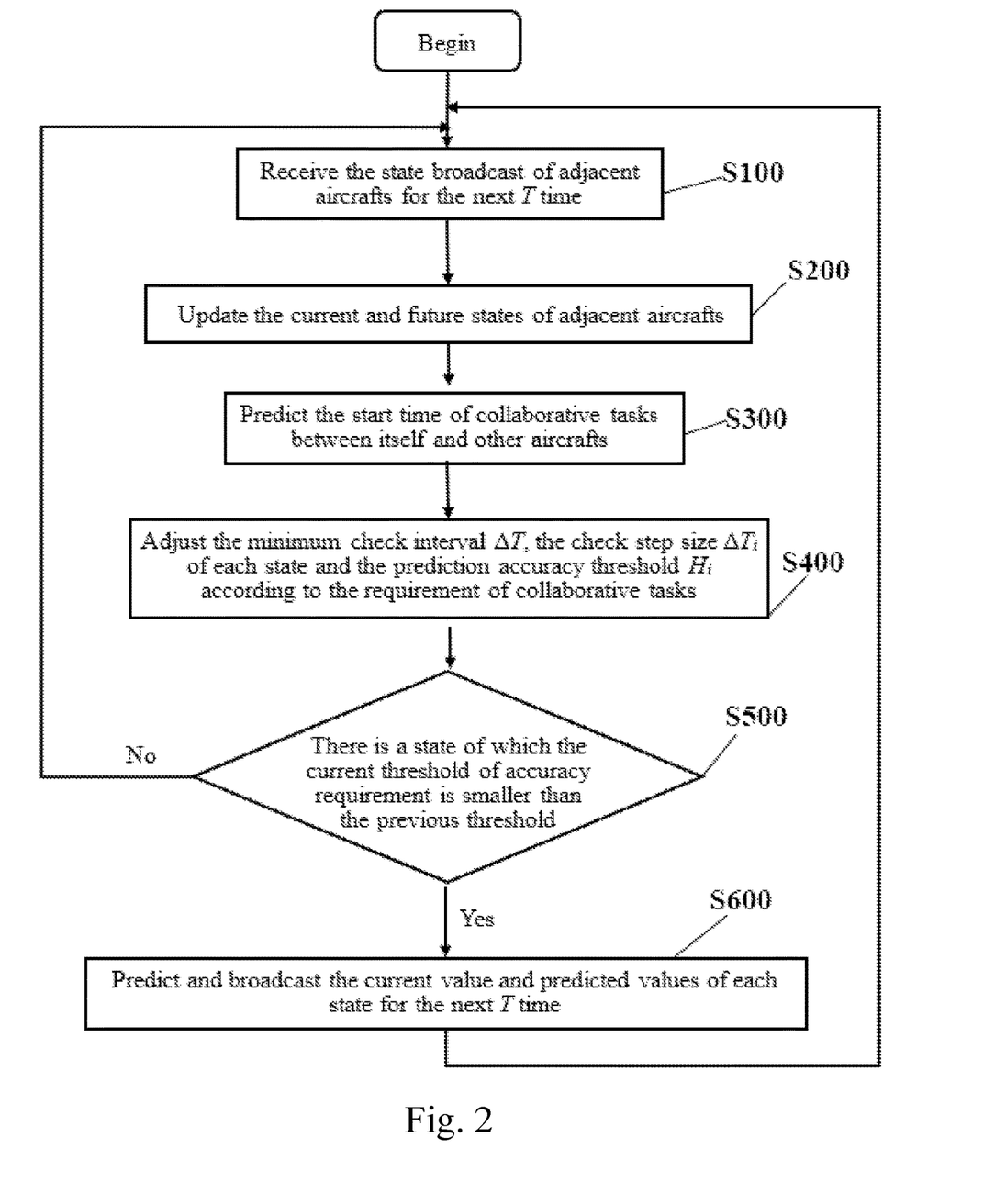
FIG. 2 is a flowchart illustrating the automatic adjustment of broadcast parameters according to the invention.

To implement approximately synchronous broadcast, the invention contains three broadcast parameters which can be dynamically adjusted according to the change in nearby space environment and its task requirement: the minimum check interval $\Delta T$, the check step size $\Delta T_i$ of each state and the required threshold $H_i$ of prediction accuracy. FIG. 2 is a flowchart illustrating the automatic adjustment of broadcast parameters according to the invention. It contains the following steps.

Step S100. Receive the state broadcast of adjacent aircrafts for the next T time. The receipt contents contain the list of broadcast queues and related broadcast parameters of the corresponding aircraft, such as the minimum check interval $\Delta T$ and the check step size $\Delta T_i$ of each state. To resume the corresponding future moment of each predicted value, the start moment of the prediction and broadcast should be obtained. The ways of obtaining start moments can be including but not limited to the following methods: one is the receipt moment minus the estimated duration of processing the prediction, transmission and receiving. There may be some errors in this way, because it takes different aircrafts different duration to process prediction, transmission and receiving. The other is that the prediction start moment is added into the broadcast contents. Since the timing system of each aircraft is independent, however, there is time inconsistency among all aircrafts. In this case, the system time of all aircrafts is calibrated to guarantee the timing consistency among all aircrafts.

Step S200. Update the current and future states of adjacent aircrafts. According to the received messages of future states, the continuous future states of an adjacent aircraft can be recovered from the discrete predicted values with the existing methods, such as Kalman filter and time-varying autoregressive TVAR model. Based on the continuous states, the start time of collaboration between one aircraft and the other aircrafts can be predicted.

Step S300. Predict the start time of collaborative tasks between itself and other aircrafts. The continuous models of future state have been gotten for all the other adjacent aircrafts in the last step. According to the models and the collaborative tasks, the start time of collaborative tasks between itself and other aircrafts is predicted with statistical learning models or neural network models.

Step S400. According to the requirement of collaborative tasks, adjust the minimum check interval $\Delta T$, the check step size $\Delta T_i$ of each state and the prediction accuracy threshold $H_i$. According to the predicted start time of collaborative tasks, the broadcast parameters of an aircraft is adjusted with machine learning methods, such as rule learning. The parameters contain the minimum interval $\Delta T$, the check step size $\Delta T_i$ of each state and the required threshold $H_i$ of prediction accuracy. The automatic adjustment of broadcast parameters is implemented based on task goal, current environment and its own states.

Step S500. Compare the current prediction accuracy threshold of each state with the previous threshold, if there is a state of which the current threshold of prediction accuracy is smaller than the previous threshold, the execute step S600; otherwise, execute step S100. Different collaborative tasks may require different prediction accuracy, and the same collaborative task requires different prediction accuracy in different environments. When a new requirement of prediction accuracy is higher than the previous requirement, a new prediction and a new broadcast are needed to be executed.

Step S600. Predict and broadcast the current value and predicted values of each state for the next T time, then execute step S100. This step contains several sub-steps, and it will be described in detail in the latter part. This process is also used in the approximately synchronous broadcast in addition to the automatic parameter adjustment in the invention.

Figure 3:
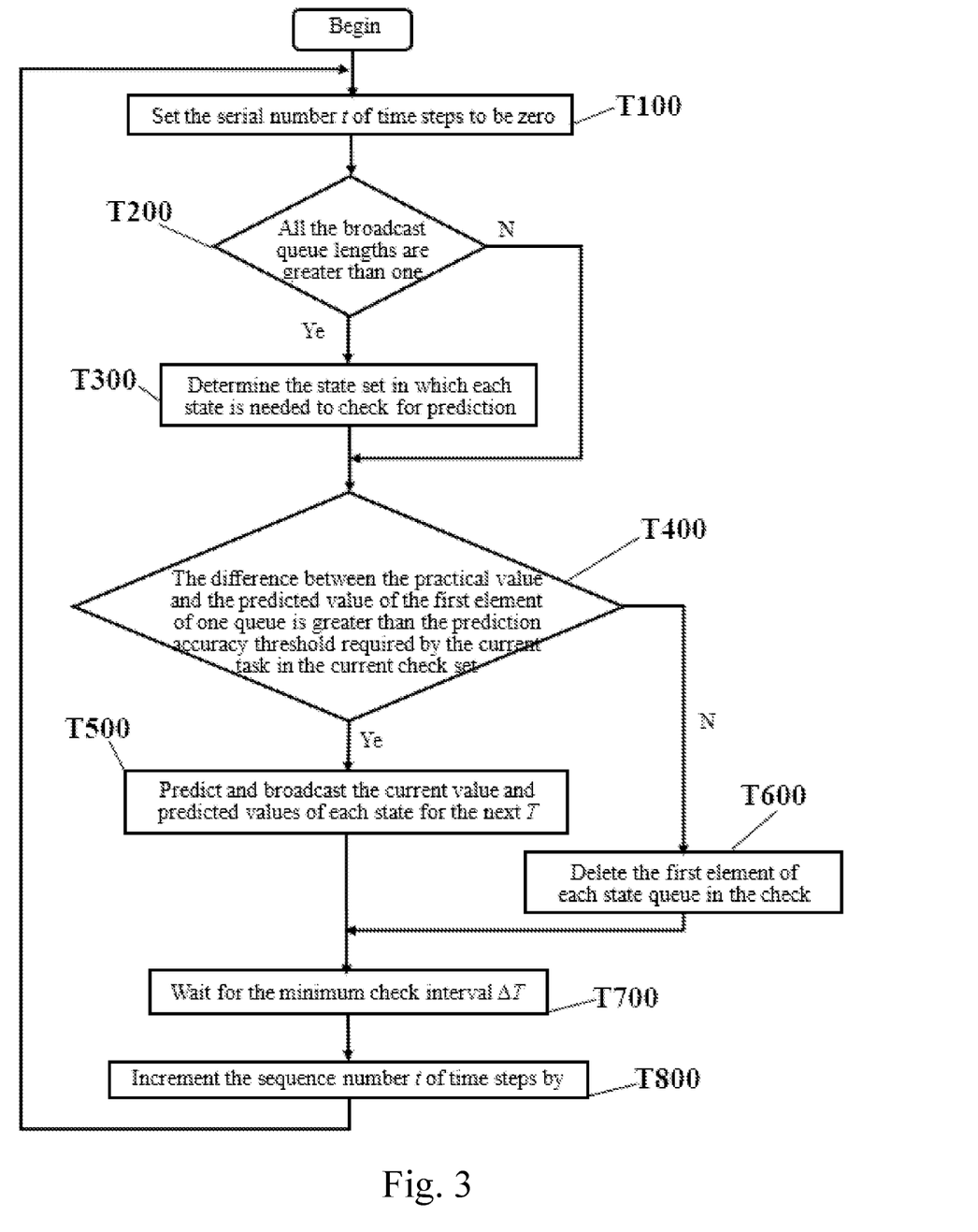
FIG. 3 is a flowchart illustrating the transmission process of approximately synchronous broadcast according to the invention.

After obtaining the related parameters of approximately synchronous broadcast, an aircraft can broadcast according to its own states and the change in surrounding environment. In the invention, the basic idea of approximately synchronous broadcast is that when its own states change slowly, the predicted values of states are more precise and may satisfy the requirement of collaborative tasks, thus the broadcast interval is long. In contrast, when its own states change drastically, the state prediction error is larger, and the prediction accuracy does not satisfy the requirement of collaborative tasks, thus the broadcast interval is short. Since different states have different change frequency, then the check step size of prediction errors of different states is also different. FIG. 3 is a flowchart illustrating the transmission process of approximately synchronous broadcast according to the invention. It contains the following steps.

Step T100. Set the serial number t of time steps to zero. To implement the prediction error check of different states, the invention introduces a serial number t of time steps and sets its initial value to zero;

Step T200. Judge whether all the broadcast queue lengths are greater than one, if yes then execute step T300, otherwise execute step T400. The aim of this step is to check whether the broadcast queue of each state is empty or whether the queue has only the last one predicted value. When the queue is empty, it shows that approximate synchronous broadcast has not begun, and has not made a prediction for future states. When the queue has only the last one predicted value, it shows that the time T of last prediction is going to come to an end. In these two cases, a new prediction should be made and a new broadcast should be transmitted.

Step T300. Determine the state set in which each state is needed to check for prediction errors. This step contains several sub-steps, and it will be described in detail in the later part;

Step T400. Judge whether the difference between the practical value and the predicted value of the first element of one queue is greater than the prediction accuracy threshold required by the current task in the current check set. If yes, then execute step T500, otherwise, execute step T600. The practical values of states is the data which is observed by the aircraft's sensors or other preceptor, and they represents the true values of states. The first elements of broadcast queues represent the future predicted values which are nearest to the present moment. When the difference between the predicted value and the current practical value is greater than the required threshold of prediction accuracy, it shows that the previously predicted results do not satisfy the requirement of current collaborative tasks, and a new prediction and broadcast are needed. Otherwise, it shows the previously predicted results still satisfy the requirement of current collaborative tasks, and the other surrounding aircrafts still can use the previously predicted results as the current real states of aircrafts;

Step T500. Predict and broadcast the current value and predicted values of each state for the next T time, then execute step T700. This process contains several sub-steps, and it is described in detail in the latter part;

Step T600. Delete the first element of each state queue in the check set. Since the values stored in broadcast queues are the predicted values of future check moments, these elements have no use to successive error check of prediction accuracy when the corresponding time of the first elements has passed in each queues of check sets over time. Then the first element of each queue should be deleted in check sets. After deleting, the corresponding time of the first element of each broadcast queue are guaranteed to be the nearest future check moment to the present moment;

Step T700. Wait for the minimum check interval $\Delta T$. The minimum interval $\Delta T$ is the minimum interval for checking the prediction errors of any broadcast state. The check step size of prediction errors of each state is positive integer times $\Delta T$. The prediction errors are checked every $\Delta T$ time for monitoring effectively the prediction accuracy errors of all states in time. This reduces the number of broadcasts on the premise of ensuring no effects on task collaboration;

Step T800. Increment the serial number t of time steps by one, then execute step T200. The broadcast step size of different states may be different. Here the serial number of time steps helps to determine check sets of states. And it is added by one every $\Delta T$ time.

Figure 4:
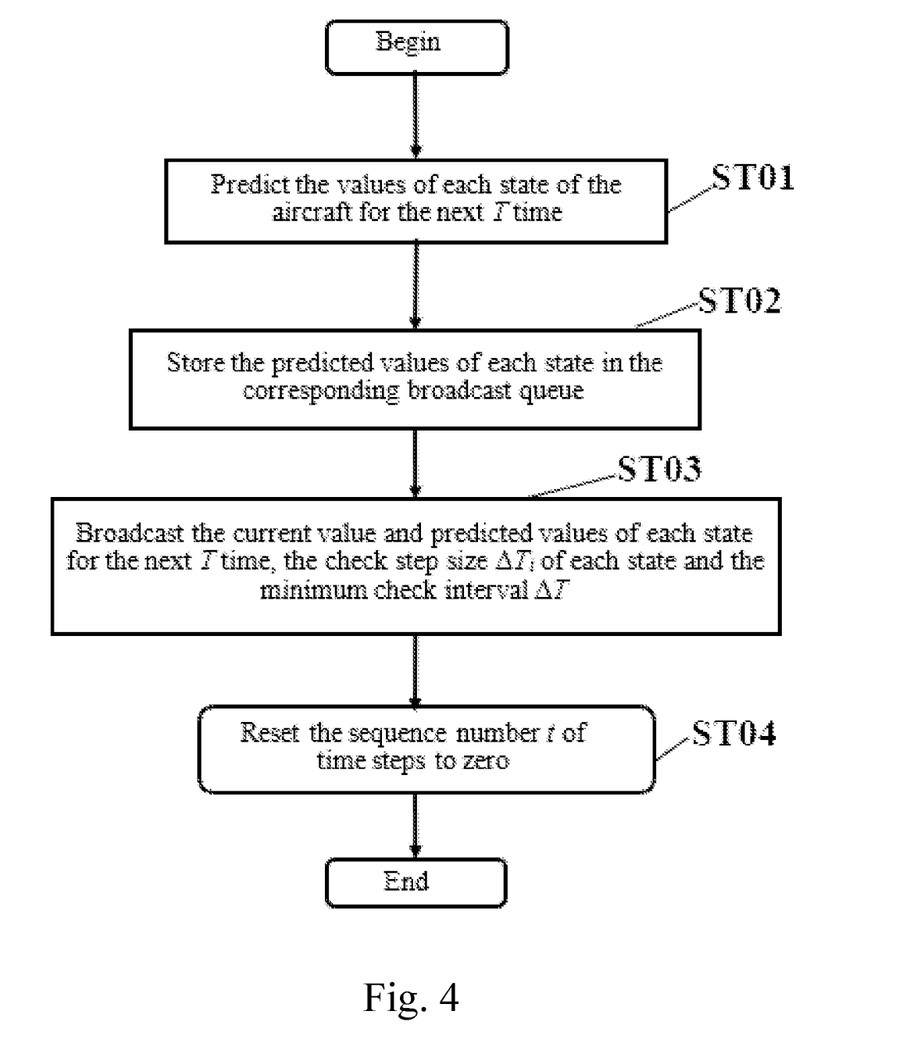
FIG. 4 is a flowchart illustrating the prediction and broadcast of one state for the next T time according to the invention.

The process of predicting and broadcast the states for the next T time is contained in both the automatic adjustment of parameters and the transmission of approximately synchronous broadcast. The process contains several steps, and FIG. 4 is a flowchart illustrating the prediction and broadcast of one state for the next T time according to the invention. It contains the following steps.

ST01. Predict the values of each state of the aircraft for the next T time. The next T time is the future duration T which starts from the current moment. The length of T can be arbitrary, and different choices can be applied to different collaborative applications. It is feasible from several seconds to tens of minutes. Here the states contain all the states which are needed to be broadcasted.

ST02. Store the predicted values of each state in the corresponding broadcast queue. The predicted results of each state are stored in the list of broadcast queues, and the first element of each queue is the current value of each state. The remaining elements of each queue are the predicted values of each state, and the predicted values are stored in queues in chronological order, i.e., the head elements of queues are checked for prediction errors earlier than the tail elements of queues. Since the check step size of prediction accuracy of each state is different, the number of predicted values of each state is different in the same time T, and correspondingly the length of queues storing the predicted results is also different.

ST03. Broadcast the current value and predicted values of each state for the next T time, the check step size $\Delta T_i$ of each state and the minimum check interval $\Delta T$. The broadcast is to transmit data in the broadcast style by the wireless communication modules of aircrafts. The broadcast content contains all the elements of the list of broadcast queues, the check step size $\Delta T_i$ of prediction accuracy of each state and the minimum check interval $\Delta T$. The styles of wireless communication can be arbitrary, such as WiFi, mobile communication, satellite communication and dedicated communications to aircrafts.

ST04. Reset the serial number t of time steps to zero. Since the serial number t of time steps are used for checking the prediction errors of each broadcast state, the serial number should be reset to zero every new prediction and broadcast.

Figure 5:
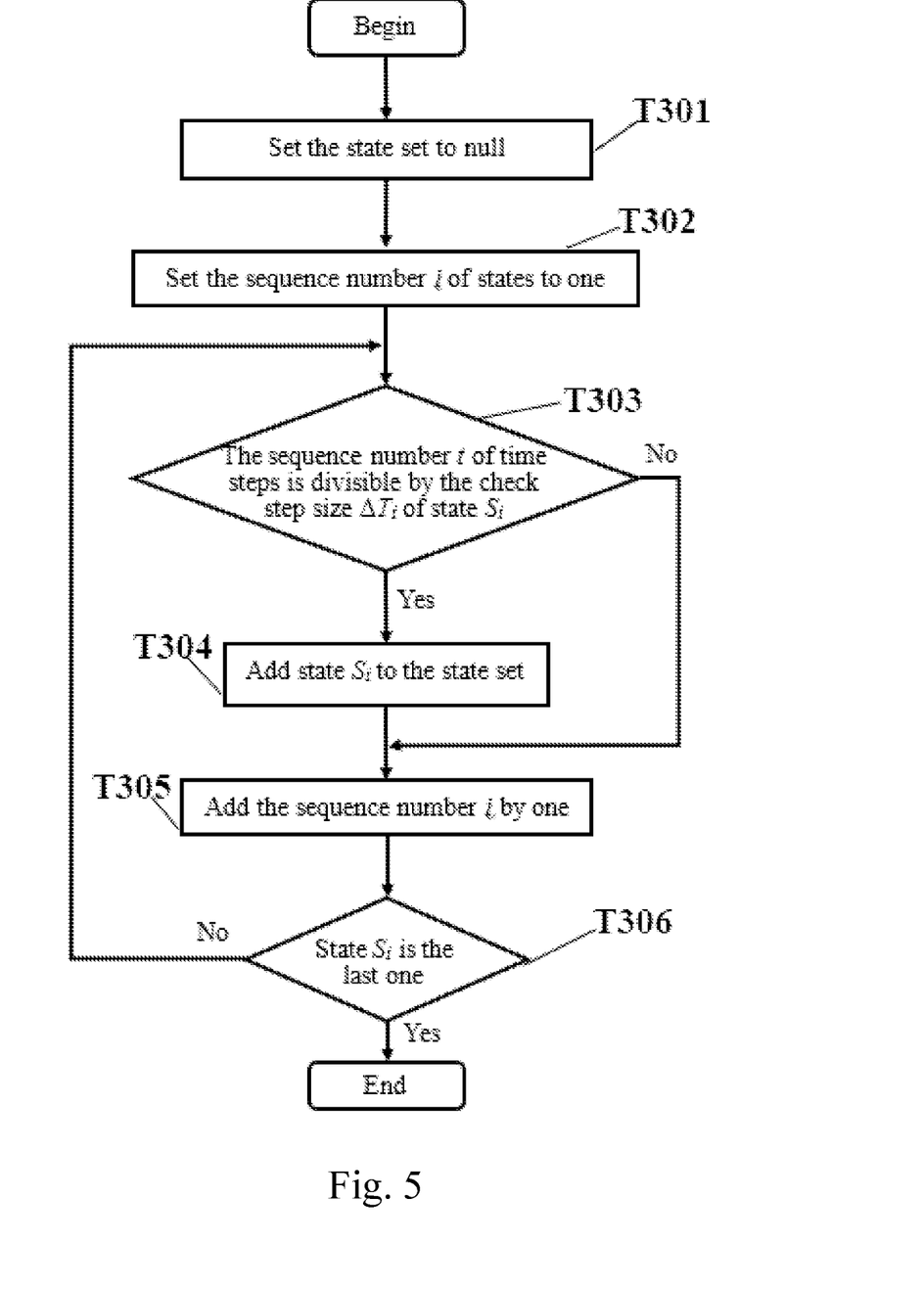
FIG. 5 is a flowchart illustrating the determination process of state set in which each state is needed to check for prediction errors according to the invention.

Because each state has different check step sizes of prediction errors, it is not necessary to check all the states for prediction errors every time slice $\Delta T$, but it is necessary to check some states for prediction errors. Therefore, the process of approximately synchronous broadcast contains one step of determining a check set of states, in which each state will be checked for prediction errors at the current moment. The step is also complex and contains several sub-steps. FIG. 5 is a flowchart illustrating the determination process of check sets in which each state is needed to check for prediction errors according to the invention. It contains the following steps.

T301. Set the state set to null. The state check set is used for storing the state set in which each state is needed to check for prediction errors at the current moment. In the beginning, the set is empty, and it shows that no states should be checked for prediction errors;

T302. Set the serial number i of states to one. The serial number i is used for checking all the states one by one, and the check starts firstly from the first state;

T303. Judge whether the serial number t of time steps is divisible by the check step size $\Delta T_i$ of state $S_i$, if yes then execute step T304, otherwise execute step T305. Since the serial number of time steps starts from the last prediction, if the serial number of time steps is divisible by a state's check step size, it shows that the state's check time has arrived, otherwise it shows that the state's check time has not arrived.

T304. Add state $S_i$ to the state set. When a checked state $S_i$ for prediction errors is found, add it to the check set.

T305. Add the serial number i by one for checking the next state.

T306. Judge whether state $S_i$ is the last one, if yes then end, otherwise execute step T303. After all the states are checked once, the determination process of state check sets ends. The states in the check set are all the states which are needed to check for prediction errors.

Figure 6:
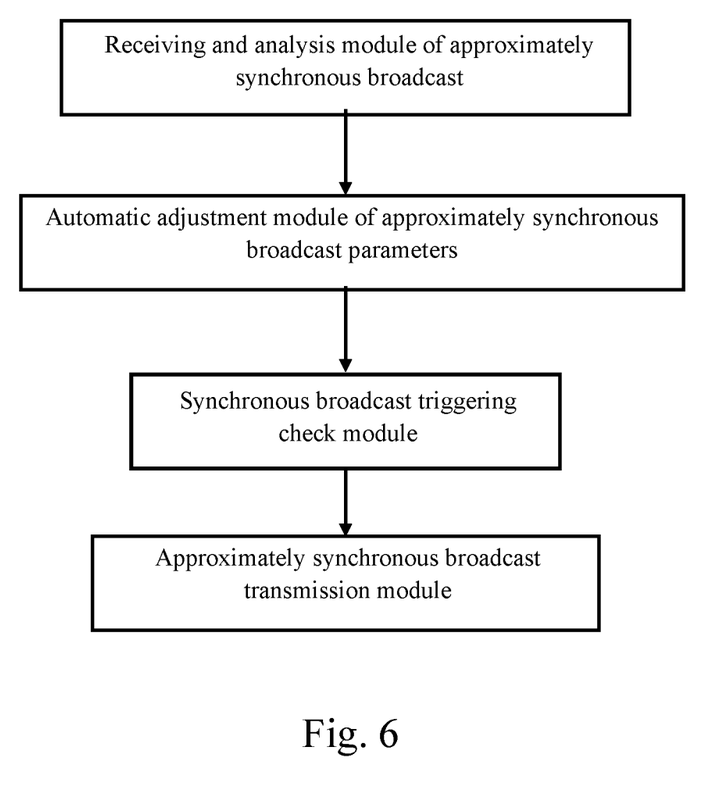
FIG. 6 is a block diagram illustrating an approximately synchronous broadcast system or device of aircrafts according to the invention.

According to the above approximately synchronous broadcast method for automatic monitoring of aircrafts, the invention further provides an approximately synchronous broadcast system or device for aircrafts. FIG. 6 is a block diagram illustrating an approximately synchronous broadcast system or device of aircrafts according to the invention, comprising:

Receiving and analysis module of approximately synchronous broadcast. It is used for receiving the approximately synchronous broadcast from other adjacent aircrafts, and analyzing the current and future states of other aircrafts, and predicting the start time of collaborative tasks between the aircraft itself and other aircrafts. In the corresponding multiple aircraft system of the invention, all the aircrafts use the same data format of packages for broadcast, and the broadcast receiving and analysis module can receive the broadcast from other aircrafts, and can analyze correctly the broadcast content, such as recovering the predicted values of all states on all the corresponding time points in the next T time, reconstructing the future continuous states of other aircrafts based on the predicted values of states with the methods, such as Kalman filter and time-varying autoregressive model. According to its future state, the other aircrafts' states and its current task, the aircraft predicts the start time of collaborative tasks with statistical models and machine learning methods.

Automatic adjustment module of approximately synchronous broadcast parameters. The module adjusts automatically the minimum check interval, the check step size of each state and the threshold of prediction accuracy according to the predicted start time of collaborative tasks and the corresponding rules of approximately synchronous broadcast. The broadcast parameters can be adjusted automatically with the change of tasks or states. There are three adjusted parameters, such as the minimum check interval, the check step size of each state and the threshold of prediction accuracy. The two parameters, i.e. the minimum check interval and the check step size, are used for adjusting the check interval of state broadcast, and the required accuracy threshold is used for adjusting the requirement of prediction accuracy according to the change of task state. For example, in the task of collaborative collision avoidance, when the flight density is high in the space, the requirement of prediction accuracy is high, otherwise, when the flight density is low in the space, the requirement of prediction accuracy is low.

Broadcast triggering check module. There are two cases which can trigger the transmission operation of broadcast. The first one is that the difference between the current value and the predicted value of one state is greater than the prediction accuracy requirement of the corresponding state. In this case, a new prediction and a new broadcast are needed. The second one also contains two cases: one is that the actual prediction accuracy does not satisfy the predefined threshold of prediction accuracy. The other is that the new threshold of prediction accuracy is higher than before since the change of tasks or surrounding environment.

Approximately synchronous broadcast transmission module. The module implements the transmission operation of broadcast, such as calling any network communication interfaces for transmitting broadcast. The broadcast content contains the list of broadcast queues, the check step size of each state and the minimum check interval. The format of data packages can be arbitrary as long as the packages contain the above contents.

The above module division is only one case among all the embodiments of the invention. The module recombination and rearrangement also belongs to the protection scope of the invention.

Obviously, the above embodiments are only some examples to illustrate the invention clearly, rather than the embodiment limitation of the invention. One of ordinary skill in the art can make some modification or change with different forms based on the invention. Herein it is unnecessary also unable to enumerate all the embodiments. Therefore, all the changes or modifications that come within the meaning and range of equivalency of the claims are to be embraced within their scope.

We claim:

1. A method for synchronous broadcast of aircrafts, the method comprising:
implementing, by an aircraft, an automatic synchronous broadcast based on state change and current task requirements of the aircraft wherein, before broadcast, a state prediction is carried out, and a predicted result of the state prediction is stored in a list of broadcast queues; a broadcast content contains the list of broadcast queues, a minimum check interval $\Delta T$ and a check step size $\Delta T_i$ of each state;
broadcasting, by the aircraft, once there is a new state prediction; a triggering condition of the state prediction and the broadcast is that a prediction time has ended or that a prediction accuracy of any state $S_i$ is greater than a threshold $H_i$ of a required prediction accuracy of the current task requirements; wherein errors of the state prediction are checked by the aircraft through time slice polling;
wherein, the aircraft comprises the list of broadcast queues and the minimum check interval $\Delta T$; each of the broadcast queue stores predicted values of a state at various moments in a short future; each state corresponds to a check step size ΔT$_i$ and a prediction accuracy threshold H$_i$ which is required by the current tasks; contents of each one of the broadcast queues comprises a current value and the predicted values of one state in the short future;

performing an automatic adjustment to broadcast parameters: the minimum check interval ΔT, the check step size ΔT$_i$ of each state and the prediction accuracy threshold H$_i$ adjusted automatically by the aircraft based on dynamic environment of adjacent space and the task requirements; the adjacent dynamic environment of the adjacent space contains the current states and short future states of all adjacent aircrafts; the dynamic environment of the adjacent space is obtained by receiving the broadcast of adjacent aircrafts; the aircraft's tasks is assigned by a suer or set by a system, and a task state is changed dynamically over time; and performing, by the aircraft, a synchronous broadcast transmission after the state prediction is finished.

2. The method of claim 1, wherein said automatic adjustment to the broadcast parameters comprises the following steps:

S100. receiving the state broadcast of the adjacent aircrafts for the next T time;

S200. updating the current state and future states of the adjacent aircrafts;

S300. predicting a start time of collaborative tasks between the aircrafts;

S400. according to a requirement of collaborative tasks, adjusting the minimum check interval ΔT, the check step size ΔT$_i$ of each state and the prediction accuracy threshold H$_i$;

S500. comparing the current prediction accuracy threshold of each state with the previous threshold; if there is a state that the current threshold of the prediction accuracy is smaller than the previous threshold, then executing step S600; otherwise, returning step S100; and S600. predicting and broadcasting the current value and the predicted values of each state for the next T time, then executing step S100.

3. The method of claim 1, wherein said synchronous broadcast transmission comprises the following steps:

T100. setting a serial number t of time steps to zero;

T200. judging whether all the broadcast queue lengths are greater than one; if yes then executing step T300, otherwise executing step T400;

T300. determining a state set in which each state needs checking for prediction errors;

T400. judging whether a difference between a practical value and the predicted value of a first element of each one of the broadcast queue is greater than the prediction accuracy threshold required by the current task in the current check set; if yes, then executing step T500, otherwise, executing step T600;

T500. predicting and broadcasting the current value and predicted values of each state for the next T time, then executing step T700;

T600. deleting the first element of each state queue in the check set;

T700. waiting for the minimum check interval ΔT; and

T800. incrementing the serial number t of time steps by one, then executing step T200.

4. The method of claim 3, wherein the step of predicting and broadcasting the current value and predicted values of each state comprises the following steps:

ST01. predicting the values of each state of the aircraft for the next T time;

ST02. storing the predicted values of each state in the corresponding broadcast queue;

ST03. broadcasting the current value and predicted values of each state for the next T time, the check step size ΔT$_i$ of each state and the minimum check interval ΔT; and ST04. resetting the serial number t of time steps to zero.

5. The method of claim 3, wherein the step of determining the state set for prediction error check comprises the following steps:

T301. setting the state set to null;

T302. setting the serial number i of states to one;

T303. judging whether the serial number t of time steps is divisible by the check step size ΔT$_i$ of state S$_i$, if yes then executing step T304, otherwise executing step T305;

T304. adding state S$_i$ to the state set;

T305. adding the serial number i by one; and

T306. judging whether state S$_i$ is the last one; if yes then end, otherwise executing step T303.

* * * * *